(12) United States Patent
Ito et al.

(10) Patent No.: US 7,518,496 B2
(45) Date of Patent: Apr. 14, 2009

(54) TRANSMITTER UNIT AND TIRE CONDITION MONITORING APPARATUS

(75) Inventors: Yoshitaka Ito, Ogaki (JP); Setsuhiro Saheki, Gifu (JP); Koji Ito, Ogaki (JP)

(73) Assignee: Pacific Industrial Co., Ltd., Gifu-Ken (JP)

( * ) Notice: Subject to any disclaimer, the term of this patent is extended or adjusted under 35 U.S.C. 154(b) by 179 days.

(21) Appl. No.: 11/192,764

(22) Filed: Jul. 29, 2005

(65) Prior Publication Data
US 2006/0028331 A1 Feb. 9, 2006

(30) Foreign Application Priority Data
Aug. 4, 2004 (JP) ............... 2004-228570

(51) Int. Cl.
*B60C 23/00* (2006.01)
(52) U.S. Cl. .............. 340/445; 340/447; 152/152.1
(58) Field of Classification Search ......... 340/442–447; 152/152.1
See application file for complete search history.

(56) References Cited

U.S. PATENT DOCUMENTS

| | | | | |
|---|---|---|---|---|
| 6,539,295 | B1 * | 3/2003 | Katzen et al. .............. 701/29 |
| 6,549,125 | B2 | 4/2003 | Nigon et al. |
| 6,624,748 | B1 * | 9/2003 | Phelan et al. .............. 340/442 |
| 6,672,150 | B2 | 1/2004 | Delaporte et al. |
| 6,694,807 | B2 * | 2/2004 | Chuang et al. ............. 73/146.5 |
| 6,696,936 | B2 * | 2/2004 | Yamagiwa et al. .......... 340/447 |
| 6,885,291 | B1 * | 4/2005 | Pollack et al. .............. 340/445 |
| 6,895,810 | B2 * | 5/2005 | Saheki et al. .............. 73/146.8 |
| 6,952,957 | B2 * | 10/2005 | Kayukawa ................. 73/146.8 |
| 7,009,506 | B2 * | 3/2006 | Wilson et al. .............. 340/445 |
| 7,091,840 | B2 * | 8/2006 | Ichinose ................... 340/447 |
| 7,350,407 | B2 * | 4/2008 | Shimura .................... 73/146 |
| 2001/0030601 | A1 | 10/2001 | Nigon et al. |
| 2002/0029627 | A1 | 3/2002 | Delaporte et al. |
| 2004/0055371 | A1 | 3/2004 | Sanchez et al. .............. 73/146 |
| 2005/0244605 | A1 | 11/2005 | Fahas et al. |

FOREIGN PATENT DOCUMENTS

| | | |
|---|---|---|
| JP | 04-212611 | 8/1992 |
| JP | 2003-200723 | 7/2003 |
| JP | 2003-312221 | 11/2003 |
| JP | 2005-240039 | 9/2005 |
| WO | WO 2004/093342 A1 | 10/2004 |

* cited by examiner

*Primary Examiner*—George A Bugg
*Assistant Examiner*—Edny Labbees
(74) *Attorney, Agent, or Firm*—Marsh Fischmann & Breyfogle LLP

(57) ABSTRACT

A transmitter unit of an apparatus for monitoring the condition of a tire includes a casing having an opening defined in an end of the casing. A transmitter is received in the casing through the opening. The transmitter gathers and wirelessly transmits information regarding the condition of the tire. The casing is secured to the outer circumferential surface of a rim wheel of the tire by an adhesive tape or an adhesive agent. Accordingly, the transmitter unit is capable of being attached to the rim wheel in a suitable manner.

4 Claims, 5 Drawing Sheets

TRANSMITTER UNIT AND TIRE CONDITION MONITORING APPARATUS

BACKGROUND OF THE INVENTION

The present invention relates to transmitter units each attached to a rim wheel of a tire for gathering and transmitting information regarding the tire including the air pressure in the tire, for the purpose of monitoring the condition of the tire, and to tire condition monitoring apparatuses having such transmitter units.

For monitoring the condition of the tires of a vehicle from its passenger compartment, wireless type tire condition monitoring apparatuses have been proposed. One such apparatus includes a plurality of transmitters and a receiver. Each of the transmitters is installed in a different one of the tires and attached to the rim wheel of the tire. The receiver is installed in a body frame of the vehicle. Each transmitter detects the condition of the corresponding tire including the air pressure and the temperature in the tire. The transmitter then wirelessly transmits a signal including detection data of the tire condition via an antenna. The signal is received by the receiver through an antenna, and information regarding the tire condition is shown on a display provided in the passenger compartment. The driver is thus allowed to monitor the condition of the tires of the vehicle constantly.

Typically, each transmitter includes a circuit board defining an electronic circuit and a housing accommodating the circuit board. The electronic circuit includes a plurality of electronic components including a pressure sensor and a signal treatment element, which are formed on the circuit board.

Conventionally, the transmitters of a wireless type tire condition monitoring apparatus are attached to tire rim wheels by means of attachment structures described in, for example, U.S. Pat. Nos. 6,549,125 and 6,672,150 and Japanese Laid-Open Patent Publication No. 2003-312221. In these structures, one or more studs project from and are fixed to the outer circumferential surface of each rim wheel through welding or swaging. Each of the studs is received in a hole defined in a portion of the housing of each transmitter. In this state, a clump member is attached to the stud, thus fixing the transmitter housing to the outer circumferential surface of the rim wheel.

However, for forming the studs on the outer circumferential surface of the rim wheel, it is necessary to define a hole in each rim and a threaded portion in each stud or bond the stud with the rim wheel through welding. That is, the conventional attachment structures are complicated to assemble, making it difficult to attach the transmitters. Also, if the studs are fixed to the rim wheels through welding, the heat generated by the welding decreases the strength of the welded portion of each rim wheel, resulting in non-uniform strength of the rim wheel as a whole.

SUMMARY OF THE INVENTION

Accordingly, it is an objective of the present invention to provide a transmitter unit that is capable of being attached to a rim wheel of a tire in a suitable manner and to provide a tire condition monitoring apparatus having such a transmitter unit.

To achieve the foregoing and other objectives and in accordance with the purpose of the present invention, the invention provides a transmitter unit of an apparatus for monitoring the condition of a tire. The tire is secured to a rim wheel. The transmitter unit includes a casing, a transmitter, and an adhesive member. The casing has an opening defined in an end of the casing. The transmitter is received in the casing through the opening. The transmitter gathers and wirelessly transmits information regarding the condition of the tire. The casing is secured to an outer circumferential surface of the rim wheel by the adhesive member.

The present invention also provides an apparatus for monitoring the condition of a tire of a vehicle. The tire is secured to a rim wheel. The apparatus includes the aforementioned transmitter unit and a receiver. The transmitter unit is secured to the rim wheel. The receiver unit is secured to a body frame of the vehicle. The receiver unit receives and processes the information regarding the condition of the tire wirelessly transmitted by the transmitter.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described with reference to the attached drawings.

Figure 1:
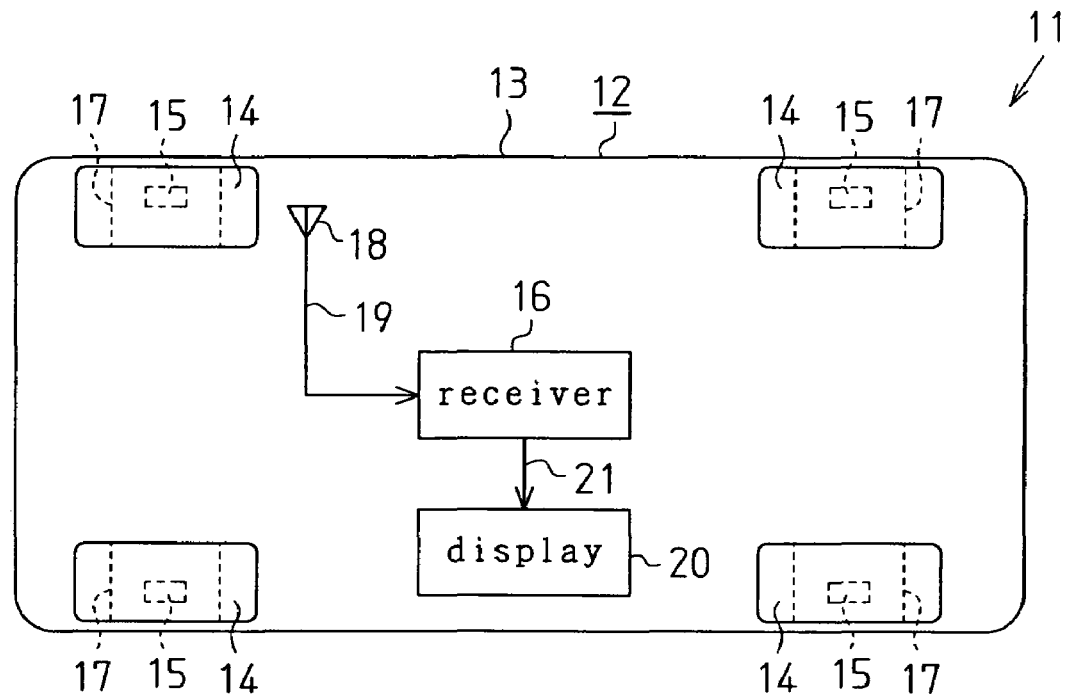
FIG. 1 is a view schematically showing a tire condition monitoring apparatus according to an embodiment of the present invention.
Figure 3:
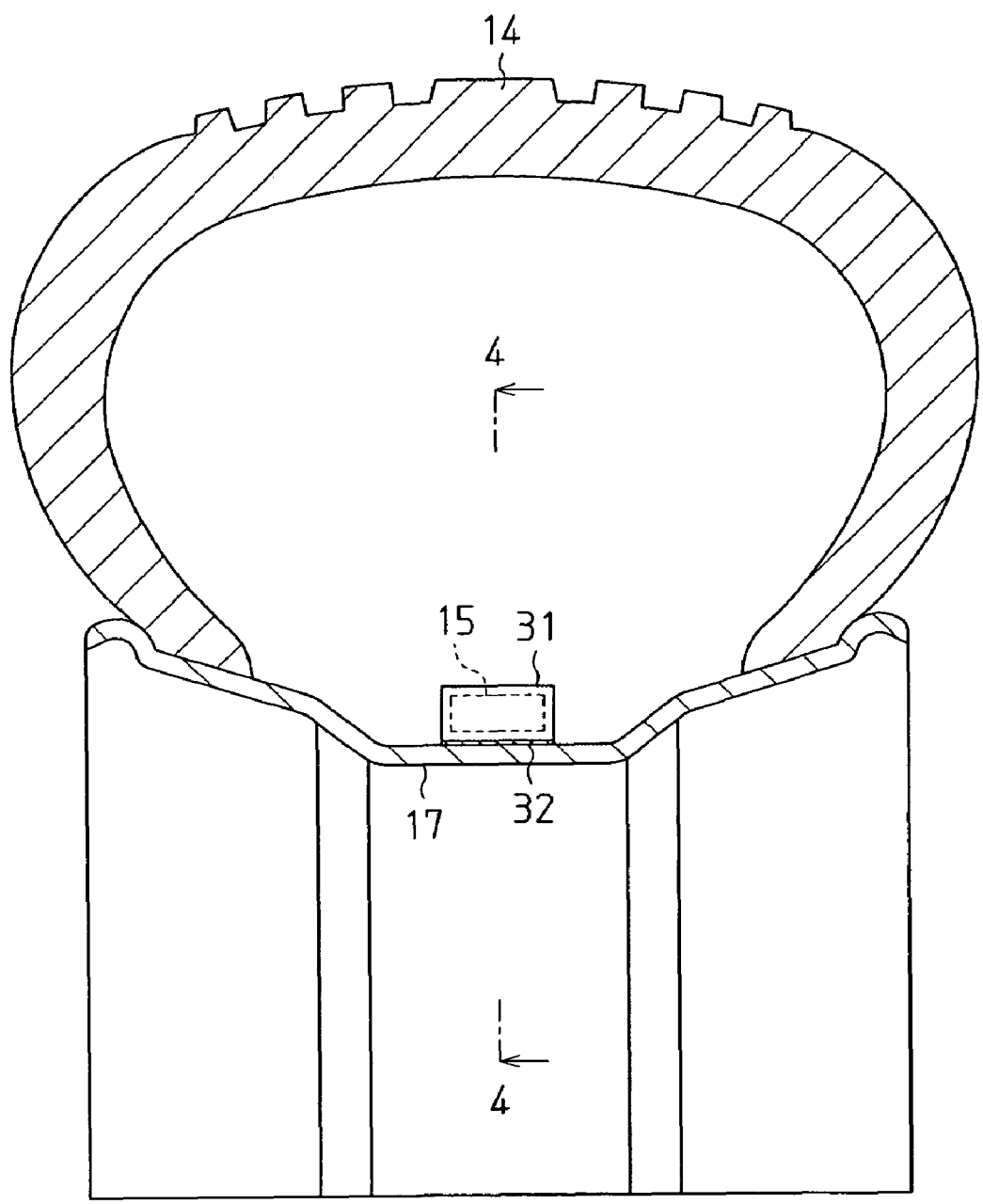
FIG. 3 is a cross-sectional view showing the transmitter of FIG. 2 attached to a tire.

As shown in FIG. 1, a tire condition monitoring apparatus 11 according to the present invention includes four transmitters 15 and a receiver 16. Each of the transmitters 15 is installed in one of four tires 14 attached to a body frame 13 of a vehicle 12. The receiver 16 is installed in the body frame 13 of the vehicle 12. Referring to FIGS. 1 and 3, each transmitter 15 is arranged in the corresponding tire 14 as fixed to an outer circumferential surface of a rim wheel 17 to which the tire 14 is attached. The transmitter 15 detects the condition of the tire 14 including the air pressure and wirelessly transmits a signal representing information including data obtained through detection.

Referring to FIG. 1, the receiver 16 is installed in an appropriate portion of the body frame 13 and powered by, for example, a non-illustrated battery installed in the vehicle 12. At least one reception antenna 18 is connected to the receiver 16 through a cable 19. The receiver 16 receives a signal wirelessly transmitted by the transmitters 15 through the reception antenna 18. A display 20 is provided in, for example, the passenger compartment of the vehicle 12 visibly from the driver. The display 20 is connected to the receiver 16 through a cable 21 and displays information regarding the} tires 14, which is obtained by the receiver 16. This allows the driver to constantly monitor the condition of the tires 14.

Figure 2:
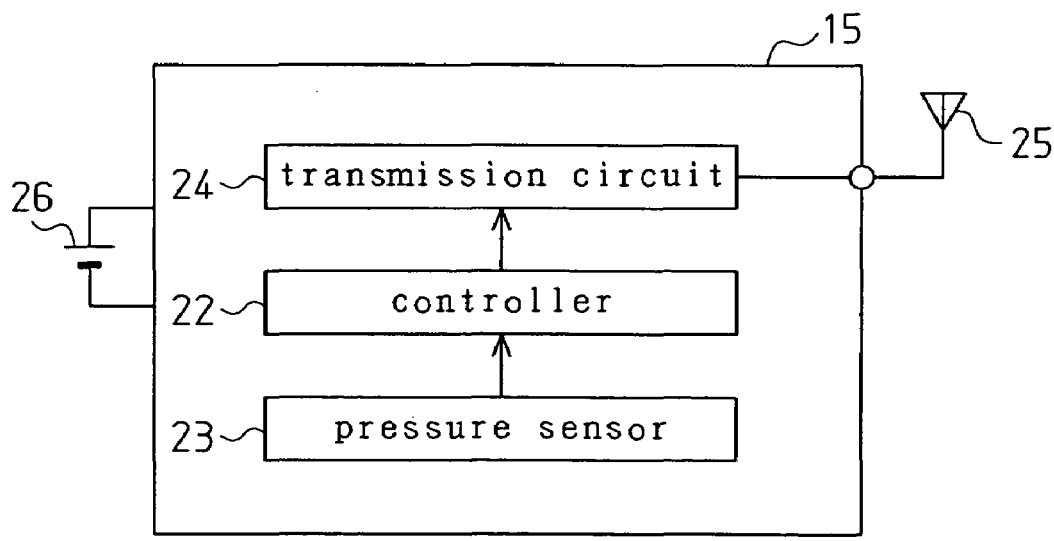
FIG. 2 is a block diagram representing a transmitter of the apparatus of FIG. 1.

As shown in FIG. 2, each transmitter 15 includes a controller 22 formed by, for example, a microcomputer. The controller 22 has various electronic components such as a central processing unit (CPU), a read only memory (ROM), and a random access memory (RAM). An internal memory of each controller 22, or, for example, the ROM, stores an ID code different from ID codes stored in other controllers 22. In correspondence with each of the ID codes, the associated one of the transmitters 15 is recognized by the receiver 16.

A pressure sensor 23 serving as a tire condition sensor detects the air pressure in the associated tire 14 and sends air pressure data obtained through detection to the associated controller 22. The controller 22 outputs data including the received air pressure data and the ID code stored in the internal memory to a transmission circuit 24. The transmission circuit 24 generates a transmission signal by encoding and modulating the data sent from the controller 22. The transmission signal is then wirelessly transmitted to the receiver 16 through a transmission antenna 25. Each of the transmitters 15 includes a battery 26 and is thus powered.

A transmitter unit including each transmitter 15 will be explained in detail. As shown in FIGS. 3 to 7, a casing 31 formed of synthetic resin is shaped like a box having a bottom 31a, opposing side walls 31b, a top wall 31c, and an end wall 31d. A lower surface of the bottom 31a has a curvature substantially equal to the curvature of the outer circumferential surface of each rim wheel 17. The casing 31 is fixed to the outer circumferential surface of the rim wheel 17 at this lower surface through a double-faced adhesive tape 32, which serves as adhesion means or an adhesive member. An opening 33 is defined in an end of the casing 31 opposed to the end wall 31d. The casing 31 is fixed to the rim wheel 17 in such a manner that the opening 33 is faced forward with respect to the rotational direction D1 of the tire 14, in a tangential direction with respect to the outer circumferential surface of the rim wheel 17.

Each transmitter 15 includes a housing 34 formed of synthetic resin and a circuit board 35 received in the housing 34. A plurality of electronic components including the controller 22, the pressure sensor 23, and the transmission circuit 24 are formed on the circuit board 35. The transmitter 15 is inserted into the interior of the casing 31 from the opening 33. In this manner, the transmitter 15 is attached to the outer circumferential surface of the rim wheel 17.

An engagement mechanism 36 serving as engagement means is formed between the inner surface of the casing 31 and the outer surface of the housing 34 for preventing the transmitter 15 from falling off the casing 31 through the opening 33. More specifically, a lever 38 (a manipulating portion) is received in a through hole 37 extending through the top wall 31c of the casing 31, by means of a support bar 39. The lever 38 is elastically deformable in this state. The casing 31, the lever 38, and the support bar 39 are formed integrally. A plurality of first projections 40 are formed along an inner surface of the lever 38 at predetermined pitches in the insertion direction of the transmitter 15.

Figure 4:
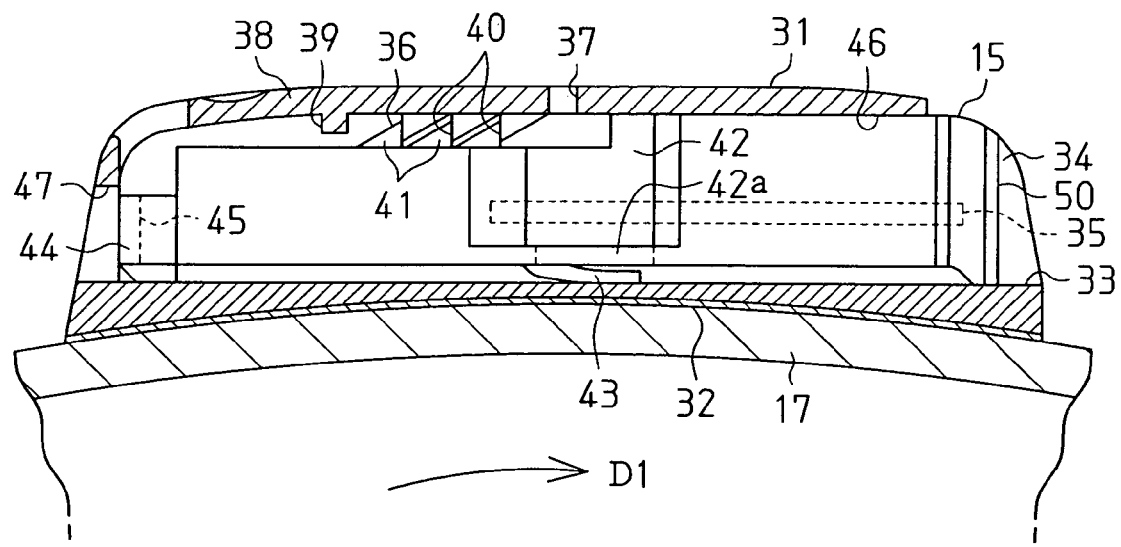
FIG. 4 is an enlarged cross-sectional view showing a portion of FIG. 3 taken along line 4-4 of the drawing.

In correspondence with the first projections 40, a plurality of second projections 41, which engage the first projections 40, are formed along an upper surface of the housing 34 of the transmitter 15 at the pitches equal to those of the first projections 40. When the transmitter 15 is inserted into the casing 31, the first projections 40 engage the second projections 41 for maintaining the transmitter 15 in the casing 31. More specifically, opposing side surfaces of each of the projections 40, 41, as viewed from the right and the left in FIG. 4, are shaped in such a manner that the first projections 40 are engaged with the second projections 41 simply by inserting the transmitter 15 into the casing 31. Further, in an engaged state, the shape of each of the first and second projections 40, 41 permits movement of the transmitter 15 in the insertion direction but prohibits falling of the transmitter 15 off the casing 31 through the opening 33. Also, the engagement strength between the projections 40, 41 is increased by centrifugal force acting on the transmitter 15 when the tire 14 rotates in direction D1. The lateral dimension of the transmitter 15 (as viewed in a vertical direction in FIG. 5) is slightly larger than the lateral dimension of the interior of the casing 31. Thus, the transmitter 15 is forcibly fitted in the casing 31 in a lateral direction.

A pair of recesses 42 are defined in opposing sides of the housing 34 of each transmitter 15. A pair of first springs 43, which serve as urging means or an urging member, each project downward from a bottom 42a of the corresponding one of the recesses 42. Each of the first springs 43 is formed by cutting and bending a portion of the bottom 42a. With the transmitter 15 accommodated in the casing 31, the urging force of each first spring 43 urges the transmitter 15 upward as viewed in FIG. 4, thus increasing the engagement strength between the first and second projections 40, 41.

A pair of stoppers 44 project integrally from an end surface of the housing 34 located distally with respect to the insertion direction of the transmitter 15. When the transmitter 15 is inserted into the casing 31, the stoppers 44 contact an inner surface of the end wall 31d of the casing 31, thus restricting the position of the transmitter 15 to a predetermined accommodating position.

A pair of second springs 45, each serving as urging means or an urging member, project integrally from the end surface of the housing 34 at a position between the stoppers 44. With the transmitter 15 received in the casing 31, the second springs 45 urge the transmitter 15 in a direction opposite to the insertion direction of the transmitter 15, thus improving the engagement strength between the first and second projections 40, 41. A rough contact surface 46 is formed on an inner surface of the top wall 31c of the casing 31 in the vicinity of the opening 33. With the transmitter 15 fitted in the casing 31, the contact surface 46 frictionally contacts the upper surface of the housing 34 of the transmitter 15. This applies anti-movement resistance to the transmitter 15, thus maintaining the transmitter 15 at the accommodating position.

Figure 5:
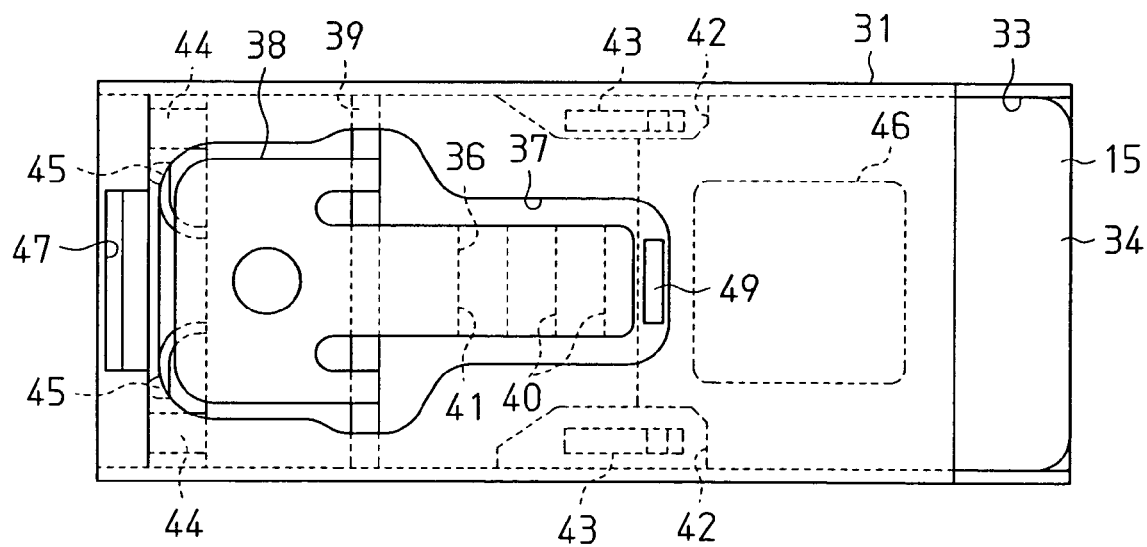
FIG. 5 is a plan view showing the transmitter of FIG. 4.

An open groove 47 is defined in the end wall 31d of the casing 31. When removing the transmitter 15 from the casing 31, a portion of the lever 38 at the left side with respect to the support bar 39 in FIG. 5 is depressed for disengaging the projections 40, 41 from one another and a tool is inserted into the casing 31 through the open groove 47. The transmitter 15 is thus pressed by the tool toward the opening 33 of the casing 31.

As shown in FIGS. 4 and 5, indicators 48, 49 are formed on the upper surface of the housing 34 of the transmitter 15. The indicator 48 indicates the insertion direction of the transmitter 15 with respect to the casing 31. The indicator 49 indicates an insertion end position. When the insertion of the transmitter 15 is completed, the indicator 49 becomes visible from the through hole 37 of the casing 31, thus informing the operator of completion of the insertion. Anti-slip portions 50 are formed at opposing sides of a rear end of the transmitter 15. When installing the transmitter 15, for example, the transmitter 15 is held by means of the anti-slip portions 50.

A method for assembling the transmitter unit, which is constructed as above-described, will be explained.

Figure 6:
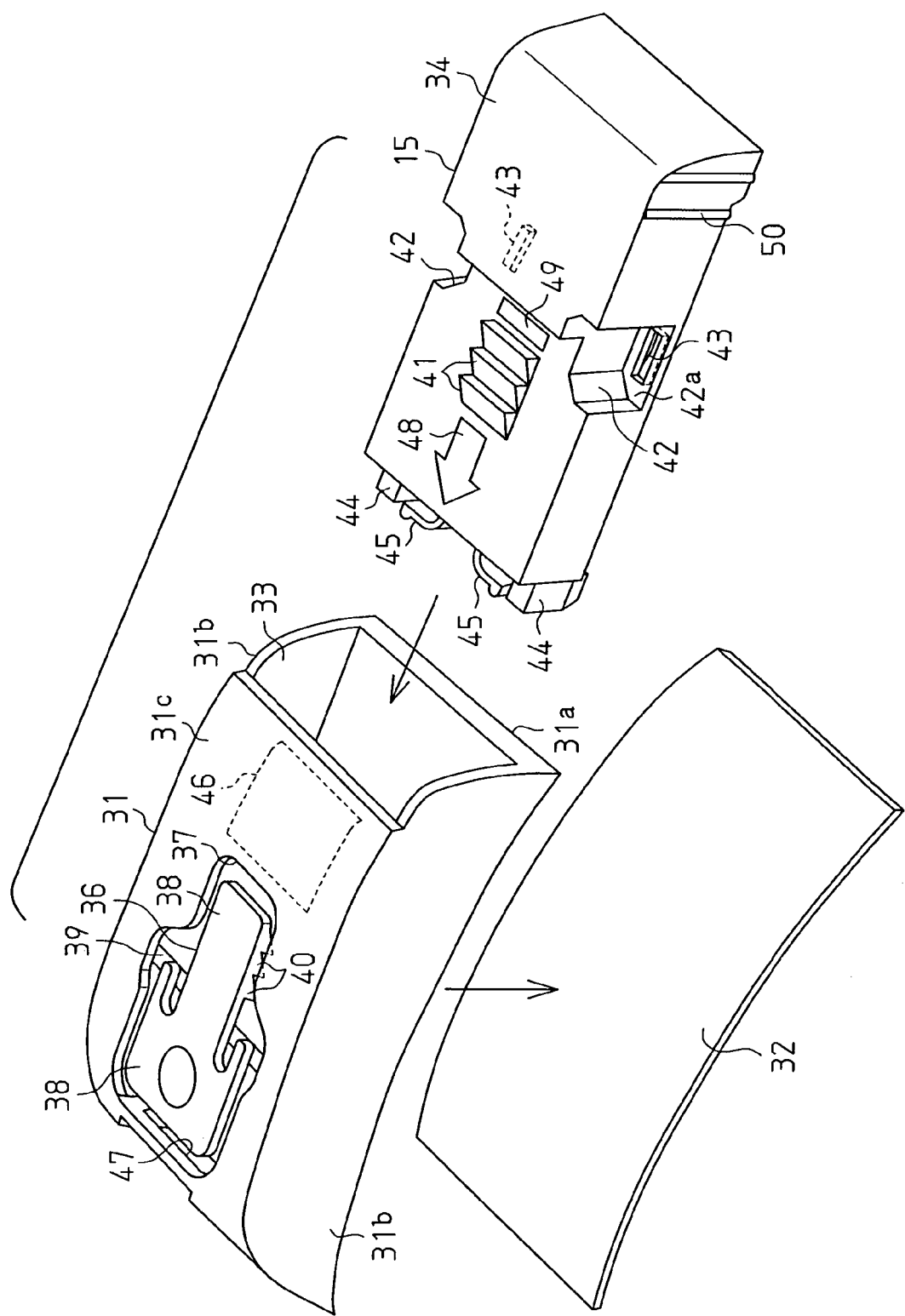
FIG. 6 is an exploded perspective view showing the transmitter of FIG. 4.
Figure 7:
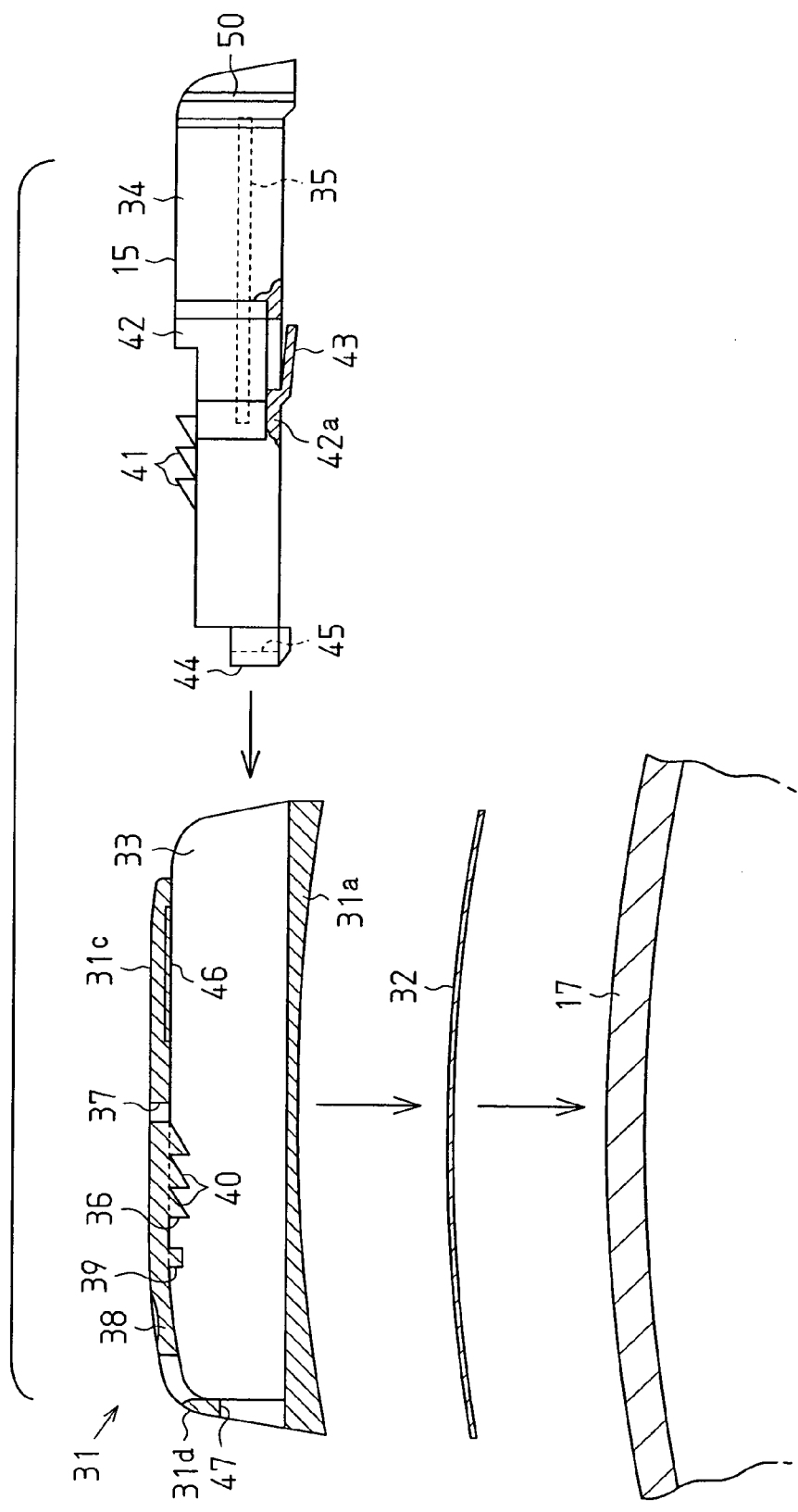
FIG. 7 is an exploded cross-sectional view showing the transmitter of FIG. 4.

First, as shown in FIGS. 6 and 7, each casing 31 is fixed to the outer circumferential surface of the corresponding rim wheel 17 through the adhesive tape 32. At this stage, the casing 31 is oriented in such a manner that the opening 33 of the casing 31 is faced forward with respect to the rotational direction D1 of the associated tire 14, tangentially with respect to the outer circumferential surface of the rim wheel 17. Then, the transmitter 15 is inserted into the casing 31 from the opening 33 using the indicator 48. When the stoppers 44 are brought into contact with the inner surface of the end wall 31d of the casing 31, the position of the transmitter 15 is restricted to the predetermined accommodating position of the casing 31. Such completion of the insertion is acknowledged visibly using the indicator 49, as well as from clicks generated by engagement of the first and second projections 40, 41.

With the transmitter 15 located at the accommodating position, the second projections 41 of the housing 34 are engaged with the first projections 40 of the casing 31 mainly by elastic force generated by the support bar 39 in a torsion-bar-like manner. The transmitter 15 is thus stopped and maintained at the accommodating position. In this state, the first springs 43 and the second springs 45 are held in contact with the inner surfaces of the casing 31 and thus elastically deformed. Accordingly, the first springs 43 generate urging force acting to urge the transmitter 15 upward as viewed in FIG. 4 and the second springs 45 generate urging force acting to urge the transmitter 15 in a direction opposed to the insertion direction. This increases the engagement strength between the first and second projections 40, 41, preventing the transmitter 15 from separating from the casing 31. Further, in this state, the rough contact surface 46, which is formed in the inner surface of the top wall 31c of the casing 31, frictionally contacts the upper surface of the housing 34, thus applying anti-movement resistance to the transmitter 15.

Accordingly, unlike the conventional transmitters, the transmitter unit of the illustrated embodiment makes it unnecessary to form the studs projecting from the outer circumferential surface of each rim wheel 17. The transmitter 15 is thus attached to the outer circumferential surface of the rim wheel 17 by the relatively easy assembly method. Also, since the rim wheel 17 is not subjected to welding in the process, the properties of the rim wheel 17 are maintained.

When the transmitter 15 is installed, the engagement between the first and second projections 40, 41, the urging force of the springs 43, 45, and the frictional contact between the contact surface 46 of the casing 31 and the housing 34 firmly maintain the transmitter 15 in a state accommodated in the casing 31. Further, if the mass of a portion of the lever 38 at the right side with respect to the support bar 39 in FIG. 5 is defined as P and the mass of a portion of the lever 38 at the left side with respect to the support bar 39 in FIG. 5 is defined as Q, the following inequality is satisfied: P<Q. Therefore, when the tire 14 rotates, centrifugal force acts to increase the engagement strength between the first and second projections 40, 41. Accordingly, if the tire 14 of the vehicle 12 rotates at a relatively high speed in direction D1 or quickly stopped from the high-speed rotation state, thus applying force to the transmitter 15 to move the transmitter 15 in an radial outward direction of the tire 14, direction D1, or an direction opposed to direction D1, the transmitter 15 is prevented from falling off the casing 31 through the opening 33 or becoming loose in the casing 31. Also, since the casing 31 is formed in a rectangular box-like shape including the bottom 31a, the side walls 31b, the top wall 31c, and the end wall 31d, the casing 31 has a relatively high rigidity and is capable of reliably accommodating and maintaining the transmitter 15.

For replacing the transmitter 15, the lever 38 of the casing 31 is pivoted about the support bar 39 against the urging force of the support bar 39 for disengaging the first projections 40 from the second projections 41. The transmitter 15 is then removed from the casing 31 and a replacement transmitter is inserted into the casing 31.

The illustrated embodiment has the following advantages.

The transmitter unit is fixed to the rim wheel 17 simply by fixing the casing 31 to the outer circumferential surface of the rim wheel 17 with the adhesive tape 32. The transmitter unit is thus relatively easily installed.

The insertion direction of the transmitter 15 is acknowledged using the indicator 48. Further, when the insertion of the transmitter 15 is completed, such completion is acknowledged using the indicator 49, which, in this state, is visible from the through hole 37. The completion is acknowledged also by clicks generated by engagement between the first and second projections 40, 41. This facilitates the installation of the transmitter unit.

Since the rim wheel 17 is not subjected to welding when fixing the casing 31 to the rim wheel 17, the properties of the rim wheel 17 are maintained without, for example, lowering the strength of the rim wheel 17.

When the transmitter 15 is inserted into the casing 31 from the opening 33, the stoppers 44 contact the inner surface of the end wall 31d and thus restrict the transmitter 15 to the predetermined accommodating position. The transmitter 15 is held at this position through engagement between the first and second projections 40, 41 by the urging force generated by the support bar 39 in a torsion-bar-like manner. That is, the transmitter 15 is installed in the casing 31 simply by inserting the transmitter 15 into the casing 31.

The first springs 43 and the second springs 45 increase the engagement strength between the first projections 40 and the second projections 41. Thus, even if the rim wheel 17 rotates at a relatively high speed, the transmitter 15 is reliably maintained in a state fixed to the casing 31.

The rough contact surface 46 formed in the inner surface of the top wall 31c of the casing 31 frictionally contacts the upper surface of the housing 34, applying anti-movement resistance to the transmitter 15. Therefore, as has been described, the transmitter 15 is reliably held in the state fixed to the casing 31.

The centrifugal force generated by rotation of the tire 14 improves the engagement strength between the first projections 40 and the second projections 41. The centrifugal force also promotes the frictional contact between the inner surface of the top wall 31c and the upper surface of the housing 34. Accordingly, when the tire 14 is rotating, the transmitter 15 is further reliably held in the state fixed to the casing 31.

The engagement between the first and second projections 40, 41 and the frictional contact between the rough contact surface 46 and the upper surface of the housing 34 occur in areas of the transmitter unit that are relatively apart from the outer circumferential surface of the rim wheel 17. In contrast, the urging of the transmitter 15 by the springs 43 occurs in an area of the transmitter unit that is relatively close to the outer circumferential surface of the rim wheel 17. This structure causes the centrifugal force produced by the rotation of the rim wheel 17 to act effectively for further increasing the engagement strength between the first and second projections 40, 41 and the frictional strength between the rough contact surface 46 and the upper surface of the housing 34. The transmitter 15 is thus further firmly fixed to the casing 31.

When the rim wheel 17 rotates or stops and causes inertia load, the inertia load is absorbed by engagement between the stoppers 44 and the end wall 31d and through the shapes of the first and second projections 40, 41. Therefore, even if the vehicle 12 is abruptly started or stopped, the transmitter 15 is maintained in the state fixed to the casing 31.

Since the casing 31 is shaped like a box, the rigidity of the casing 31 is relatively great and the casing 31 reliably accommodates and maintains the transmitter 15. Further, the transmitter 15 receives the urging forces of the springs 43, 45 at two positions, or the position corresponding to one of the opposing ends of the transmitter 15 and the position corresponding to the middle of the transmitter 15. Also, the transmitter 15 is maintained in the casing 31 at two positions, or the position corresponding to the first and second projections 40, 41 and the position corresponding to the contact surface 46. The transmitter 15 is thus reliably prevented from becoming loose in the casing 31.

Replacement of the transmitter 15 is readily performed simply by pivoting the lever 38 of the casing 31.

The illustrated embodiment may be modified as follows.

The casing 31 may be fixed to the rim wheel 17 by the adhesion means or the adhesive member in such a manner that the opening 33 of the casing 31 is faced rearward with respect to the rotational direction D1 of the tire 14 or in a direction defined by the width of the tire 14. If the opening 33 of the casing 31 is faced in the direction defined by the width of the tire 14 with the casing 31 fixed to the rim wheel 17, the lower surface of the bottom 31a of the casing 31 must have a curvature matching the shape of the outer circumferential surface of the rim wheel 17 in the direction defined by the width of the tire 14.

An adhesive agent may be used as the adhesion means or the adhesive member, instead of the double-faced adhesive tape 32, for fixing the casing 31 to the rim wheel 17.

The first springs 43 and/or the second springs 45 may be provided in an inner surface of the casing 31.

The stoppers 44 may be formed in an inner surface of the casing 31.

The rough contact surface 46 may be formed in the upper surface of the housing 34 of the transmitter 15 instead of the inner surface of the casing 31. Alternatively, such contact surfaces may be formed in both of the upper surface of the housing 34 of the transmitter 15 and the inner surface of the casing 31.

A temperature sensor for detecting the interior temperature of the tire 14 may be provided as a tire condition sensor, in addition to or instead of the pressure sensor 23.

The invention claimed is:

1. A transmitter unit of an apparatus for monitoring the condition of a tire, the tire being secured to a rim wheel, the transmitter unit comprising:
   a casing having an opening defined in an end of the casing, wherein the casing includes a first projection;
   a transmitter for gathering and wirelessly transmitting information regarding the condition of the tire, wherein the transmitter is inserted through the opening into the casing in a first direction, which is a tangential direction with respect to the rim wheel, thereby being received in the casing, wherein the transmitter includes a second projection, the second projection being engaged with the first projection of the casing by inserting the transmitter into the casing in the first direction through the opening, thereby preventing the transmitter from moving in a second direction, which is opposite to the first direction;
   an adhesive member by which the casing is secured to an outer circumferential surface of the rim wheel; and
   an urging member for urging the transmitter received in the casing in the second direction.

2. The transmitter unit according to claim 1, wherein one of the casing and the transmitter is a first member, and the other is a second member, wherein the first member includes a rough surface, the rough surface frictionally contacts a corresponding portion of the second member when the transmitter is received in the casing.

3. The transmitter unit according to claim 2, wherein the urging member is a first urging member, the transmitter unit further comprising a second urging member for urging the transmitter received in the casing to bring the rough surface of the first member into intimate contact with the corresponding portion of the second member.

4. The transmitter unit according to claim 1, wherein the engagement strength between the first and second projections is increased by centrifugal force when the tire rotates.

* * * * *